United States Patent
Jorgensen

Patent Number: 6,034,326
Date of Patent: Mar. 7, 2000

[54] CONDUIT CONNECTOR ASSEMBLY SPRING CLIP HAVING SCALLOPED SHAPED CONDUIT GRIPPING END

[75] Inventor: Robert W. Jorgensen, Niles, Mich.

[73] Assignee: Hubbell Incorporated, Orange, Conn.

[21] Appl. No.: 09/019,116

[22] Filed: Feb. 5, 1998

[51] Int. Cl.⁷ .................................................. H02G 3/18
[52] U.S. Cl. ........................................ 174/65 R; 285/162
[58] Field of Search ............................... 174/65 R, 65 G, 174/151, 152 G, 153 G, 152 R, 153 R; 16/2.1, 2.2; 248/56; 285/194, 162

[56] References Cited

U.S. PATENT DOCUMENTS

| | | | |
|---|---|---|---|
| Re. 15,891 | 8/1924 | Thomas, Jr. ............................... 16/2 X |
| 1,204,625 | 11/1916 | Wheeloak ......................... 174/152.6 X |
| 2,255,971 | 9/1941 | Hall ............................................. 16/2 |
| 2,465,044 | 3/1949 | Broshabor ........................... 285/194 X |
| 2,736,450 | 2/1956 | Atkinson .............................. 220/3.6 X |
| 2,744,769 | 5/1956 | Roeder et al. ......................... 248/56 X |
| 3,858,151 | 12/1974 | Paskert .................................. 285/162 X |
| 4,012,578 | 3/1977 | Morkan et al. ............................ 174/51 |
| 4,021,604 | 5/1977 | Dola et al. ................................ 174/51 |
| 4,711,472 | 12/1987 | Schnell ............................. 674/153.6 X |
| 4,880,387 | 11/1989 | Stikeleather et al. ..................... 439/98 |
| 4,990,721 | 2/1991 | Sheehan .................................... 174/65 |
| 5,171,164 | 12/1992 | O'Neil et al. .......................... 439/552 |
| 5,204,499 | 4/1993 | Faualora ................................ 174/65 R |
| 5,276,280 | 1/1994 | Ball ....................................... 174/65 R |
| 5,285,013 | 2/1994 | Schnell et al. ........................ 174/65 R |
| 5,373,106 | 12/1994 | O'Neil et al. ......................... 174/65 R |
| 5,422,437 | 6/1995 | Schnell ................................. 174/65 R |
| 5,731,543 | 3/1998 | Jorgensen ............................. 174/65 R |

*Primary Examiner*—Dean A. Reichard
*Attorney, Agent, or Firm*—Jerry M. Presson; Michael R. Swartz

[57] ABSTRACT

A conduit connector assembly which receives an end of a conduit carrying electrical wires includes a fitting body, an end stop grommet and a spring clip. The end stop grommet and the spring clip are each mounted to the fitting body. The spring clip is disposed within an interior bore of the fitting body and has a resiliently flexible body and a gripping end portion on the body defining a grip end. The grip end has a substantially scalloped configuration for gripping and fitting partially about the conduit so as to center the grip end of the spring clip body on the conduit. The grip end having the scalloped configuration is in the form of an arcuate concave-shaped edge surface on the gripping end portion of the body. The grip end of the spring clip body makes line contact with an inner convolution on an exterior of the conduit and makes at least a single point contact with an outer convolution on the exterior of the conduit. The grip end may be disposed at a predetermined angle for matching a predetermined pitch angle of the convolutions on the exterior of the conduit and thereby make line contact with the inner convolution on the exterior of the conduit and make a pair of point contacts with the outer convolution on the exterior of the conduit.

13 Claims, 2 Drawing Sheets

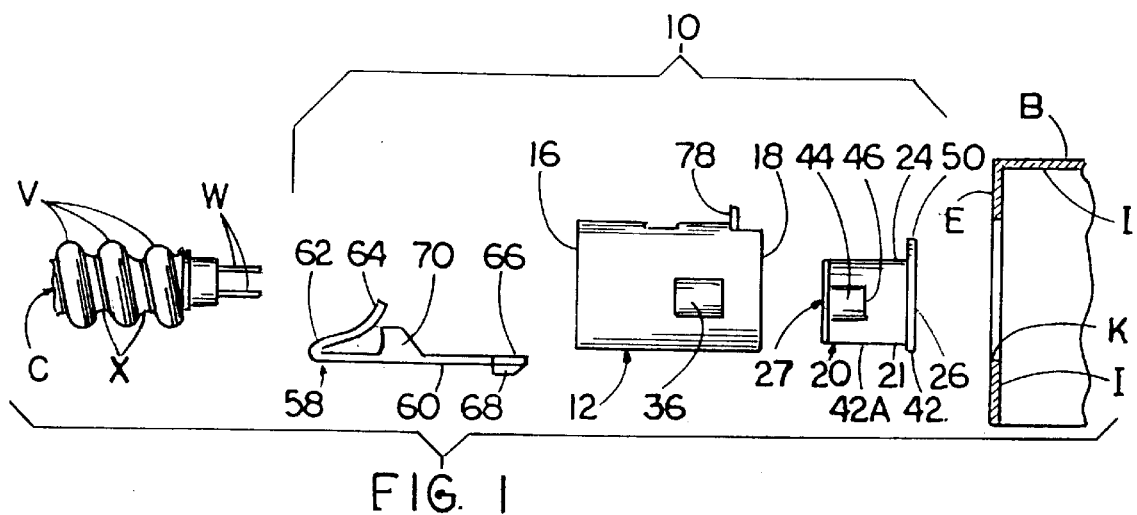
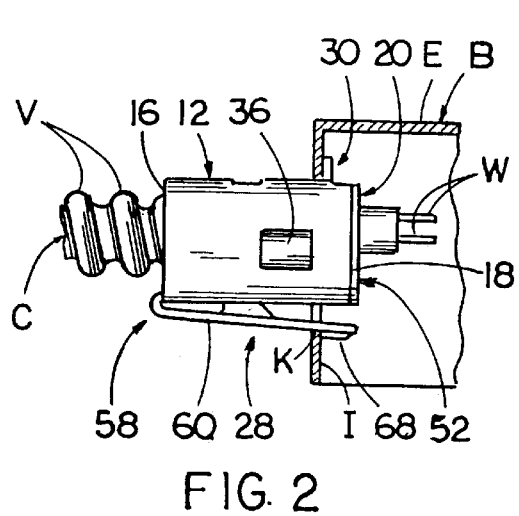
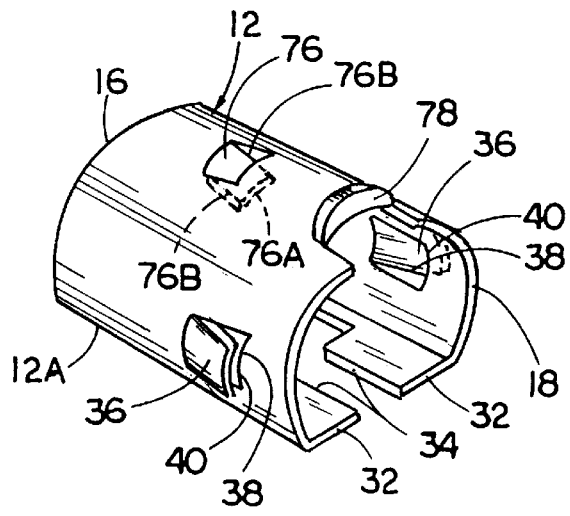
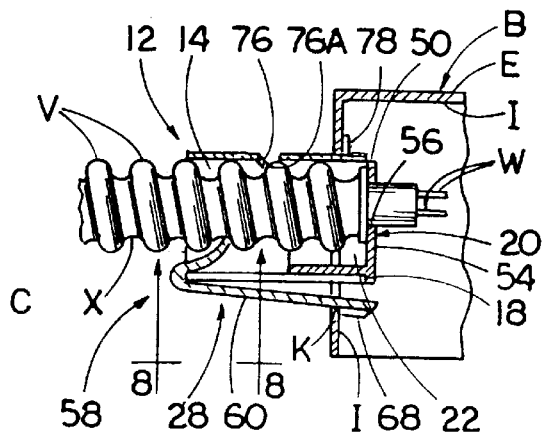
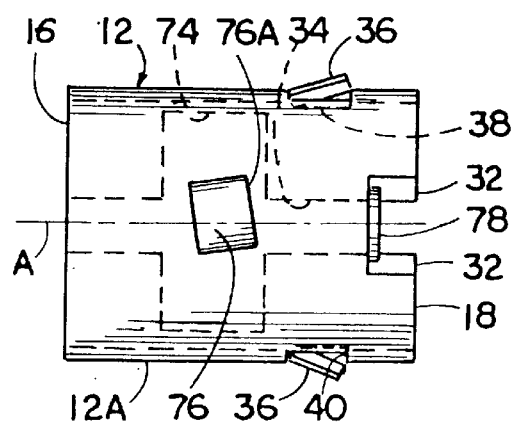

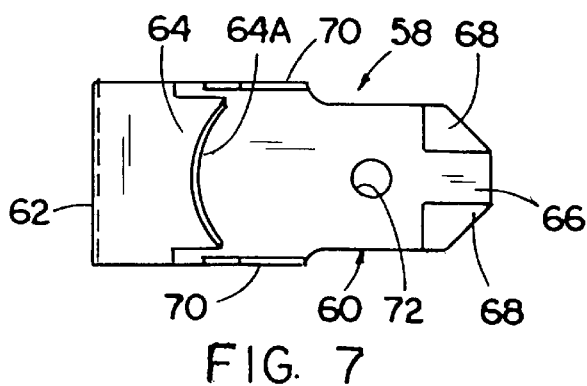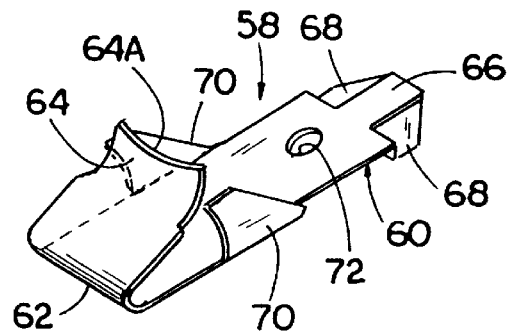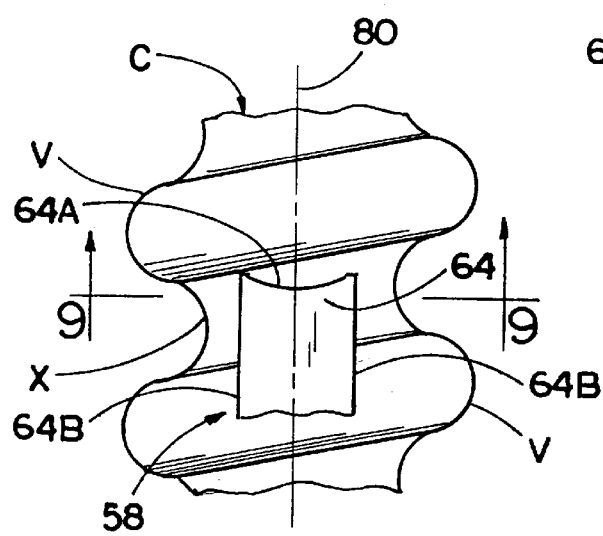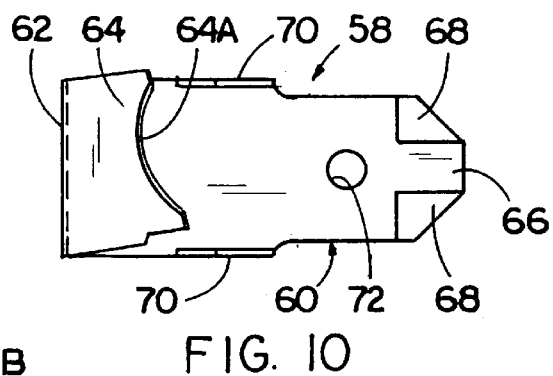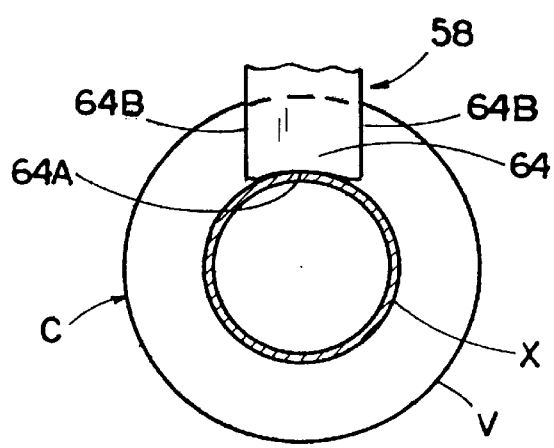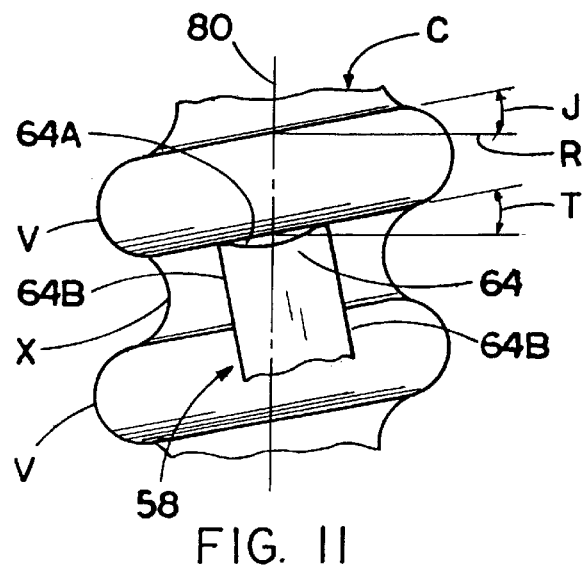

CONDUIT CONNECTOR ASSEMBLY SPRING CLIP HAVING SCALLOPED SHAPED CONDUIT GRIPPING END

CROSS REFERENCE TO RELATED APPLICATION

Reference is hereby made to the following copending U.S. applications dealing with subject matter related to the present invention and assigned to the same assignee as the present invention:

(1) "Conduit Connector Assembly With End Stop Grommet For Attachment Of Conduit To Junction Box" by Robert W. Jorgensen, assigned U.S. Ser. No. 08/654,067, filed May 28, 1996, now U.S. Pat. No. 5,731,543.

(2) "Conduit Connector Assembly With Angled Conduit Gripping Means" by Robert W. Jorgensen, assigned U.S. Ser. No. 08/019,115 and filed Feb. 5, 1998.

BACKGROUND OF THE INVENTION

1. Field of the Invention

The present invention generally relates to conduit connector devices and, more particularly, is concerned with a conduit connector assembly spring clip having a scalloped shaped end portion for fitting partially about and centering a conduit carrying electrical wires with the conduit connector assembly so as to prevent the conduit from being pulled from the connector assembly.

2. Description of the Prior Art

Electrical wiring is used for the connection of main electrical power lines and electrical outlets in order to provide access to electrical power in residential and commercial buildings and the like. Electrical junction boxes are provided in the buildings to receive portions of the electrical wiring and contain and isolate therein splices in the wiring which extends from the junction boxes to the main electrical power lines and to outlets and switches in the building. For protection of the electrical wiring, the wiring is generally housed and carried within metal conduits or metal cables (hereafter referred to as conduit). It is also desirable to connect ends of the metal conduits to the electrical junction boxes.

A variety of devices have been used over the years for connecting conduits which carry electrical wires to electrical junction boxes. Representative examples of these devices are disclosed in U.S. Pat. No. 3,369,071 to Tuisku, U.S. Pat. No. 4,012,578 to Moran et al., U.S. Pat. No. 4,021,604 to Dola et al., U.S. Pat. No. 4,880,387 to Stikeleather al., U.S. Pat. No. 4,990,721 to Sheehan, U.S. Pat. No. 5,171,164 to O'Neil et al., U.S. Pat. No. 5,204,499 to Favalora, U.S. Pat. No. 5,276,280 to Ball, U.S. Pat. No. 5,285,013 to Schnell et al., U.S. Pat. No. 5,373,106 to O'Neil et al. and U.S. Pat. No. 5,422,437 to Schnell.

One such device produced and sold by Hubbell, Incorporated, of Orange, Conn., includes a fitting body having an interior bore with four integral end tabs folded ninety degrees to serve as an end stop at a first opposite end of the fitting body for insertion into an electrical junction box and a spring clip for attachment at the bottom of a second opposite end of the fitting, body for gripping a conduit carrying electrical wires inserted within the fitting body. While this prior art Hubbell conduit connector device has performed with satisfaction over the years and has met objectives it was originally designed to achieve, the device does not meet current performance standards. As in the case of any product, over time improvements are required.

Consequently, a need exists for improvement of the prior art Hubbell conduit connector device which meets current performance standards and yet is economical to manufacture.

SUMMARY OF THE INVENTION

The present invention provides a conduit connector assembly for connecting a conduit carrying electrical wires to an electrical junction box which is generally used to receive electrical wiring whenever an outlet, switch, or access to splices is desired in a building. The conduit connector assembly of the applications cross-referenced above and the conduit connector assembly of the present invention are all designed to satisfy the aforementioned need by providing a fitting body, an end stop grommet and a spring clip defining a means for gripping the conduit. However, a shortcoming in the connector assemblies of the cross-reference applications are that due to their configurations, the conduit gripping means on the spring clip is not necessarily centered on the conduit and, as a result, may produce a gripping force which, under certain conditions, is insufficient to prevent the conduit from being pulled out of the connector assembly. The spring clip of the connector assembly of the present invention is provided with a conduit gripping means which is scalloped shaped so as to fit partially about the conduit and center the conduit gripping means on the conduit so that a greater and more uniformly applied gripping force is produced that will substantially prevent the conduit from being pulled out from the connector assembly.

Accordingly, the present invention is directed to a spring clip for a conduit connector assembly attaching a conduit carrying electrical wires to an electrical junction box. The spring clip comprises: (a) a resiliently flexible body; and (b) a gripping end portion on the body defining a grip end having a substantially scalloped configuration for gripping and fitting partially about the conduit so as to center the grip end of the body on the conduit.

The present invention is also directed to a conduit connector assembly used for attachment of a conduit carrying electrical wires to an electrical junction box. The connector assembly comprises: (a) a fitting body having a pair of open first and second opposite ends and an interior bore extending between the first and second opposite ends for receiving therein from the first opposite end an end portion of a conduit carrying electrical wiring which emanates from the end portion of the conduit, the fitting body at the second opposite end being insertable through an opening in an electrical junction box; (b) end stop means on the fitting body for allowing passage of the electrical wiring into the electrical junction box and preventing passage of the end portion of the conduit into the electrical junction box; (c) a spring clip mounted to the fitting body and having a resiliently flexible body and a gripping end portion on the body defining a grip end disposed within the interior bore of the fitting body, the grip end having a substantially scalloped configuration for gripping and fitting partially about the conduit so as to center the grip end of the body on the conduit; and (d) means on the fitting body for connecting the fitting body to the electrical junction box.

The grip end of the gripping end portion of the body of the spring clip makes line contact with an inner convolution on the exterior of the conduit and makes at least a single point contact with an outer convolution on the exterior of the conduit. The grip end may be disposed at a predetermined angle for matching a predetermined pitch angle of the convolutions on the exterior of the conduit and thereby makes line contact with the inner convolution of the conduit and makes a pair of point contacts with the outer convolution of the conduit. The predetermined angle may be between five and fifteen degrees, and preferably ten degrees. The end portion of the spring clip body has a pair of opposite sides which may be disposed in accordance with the predetermined angle of the grip end, between five and fifteen degrees, and preferably ten degrees, relative to a longitudinal axis of the fitting body. The scalloped configuration of the grip end of the body is defined by an arcuate concave-shaped surface on the grip end of the body.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an exploded side elevational view of a conduit connector assembly having a spring clip in accordance of the present invention for attachment of a conduit carrying electrical wires to an electrical junction box.

FIG. 2 is a side elevational view of the conduit connector assembly in assembled form attaching the conduit to the electrical junction box.

FIG. 3 is a longitudinal sectional view of the conduit connector assembly of FIG. 2.

FIG. 4 is a perspective view of a fitting body of the conduit connector assembly.

FIG. 5 is a top plan view of the fitting body shown in FIG. 4 showing a grip tab disposed at a predetermined angle relative to a longitudinal axis of the fitting body for making line contact with a portion of convolutions on an exterior surface of the conduit.

FIG. 6 is a perspective view of a spring clip of the conduit connector assembly showing a end portion defining a grip end for gripping the conduit and having a substantially scalloped configuration for centering of the grip end on the conduit.

FIG. 7 is a top plan view of the spring clip of FIG. 6.

FIG. 8 is a bottom plan view depicting a single point contact made between the grip end of the end portion of the spring clip of FIG. 6 and an outer convolution of the conduit.

FIG. 9 is a cross-sectional view taken along line 9—9 of FIG. 8 depicting a line contact made between the grip end of the gripping end portion of the spring clip and an inner convolution of the conduit.

FIG. 10 is a top plan view of the spring clip disposed at a predetermined angle and showing the grip end of the gripping end portion having the substantially scalloped configuration for centering of the grip end on the conduit.

FIG. 11 is a bottom plan view depicting line contact made between the grip end of the gripping end portion of the spring clip shown in FIG. 10 and an outer convolution of the conduit.

DETAILED DESCRIPTION OF THE INVENTION

Referring to the drawings and particularly to FIGS. 1 to 3, there is illustrated a conduit connector assembly, generally designated 10, of the present invention. The conduit connector assembly 10 is used for connecting a conduit C, normally comprised of a metal material and carrying electrical wires W, to a knockout opening K in an electrical junction box B which is used to receive electrical wiring W and contain splices made in end portions of the wiring W. The assembly 10 is designed to hold over 200 pounds without crushing the conduit C which is hollow and typically comprised substantially of thin aluminum or steel metal material.

Basically, the conduit connector assembly 10 includes a fitting body 12 defining an interior bore 14 and having a pair of open first and second opposite ends 16, 18, an end stop grommet 20 interfitted with the fitting body 12 and having a grommet body 21 defining an interior cavity 22 extending between a pair of open first and second end portions 24, 26 of the grommet body 21 with the grommet body 21 being inserted at the first end portion 24 thereof into the interior bore 14 of the fitting body 12 from the second opposite end 18 of the fitting body 12 to a predetermined position therein, and securing means 27 for securing the end stop grommet 20 to the fitting body 12 in their interfitted relationship. The assembly 10 also includes gripping means 28 for securing the end portion of the conduit C within the interior bore 14 of the fitting body 12 and within the interior cavity 22 of the grommet body 20, and connecting means 30 for securing the fitting body 12 to the junction box B.

Referring now to FIGS. 1 to 5, the fitting body 12 of the assembly 10 more particularly is preferably made from a blank of suitable metal material, such as steel, and manufactured by any suitable conventional technique, such as by being rolled over a form, to provide the fitting body 12 with a substantially cylindrical shape longitudinally truncated by a flat side portion 32. The fitting body 12 has a longitudinal slit 34 extending the full length through the longitudinal center of the flat side portion 32 thereof. During assembling of the end stop grommet 20 to the fitting body 12, the longitudinal slit 34 allows the fitting body 12 to be transversely expanded and open wide enough across the slit 34 for insertion of the first end portion 24 of the grommet body 21 into the interior bore 14 of the fitting body 12 and then to contract and close over and thereby capture the first end portion 24 of the stop body 21 within the interior bore 14 of the fitting body 12. The fitting body 12 further has a pair of outwardly extending securing tabs 36 formed out of wall portions 12A of the fitting body 12 on opposite sides thereof. Formation of each securing tab 36 leaves a substantially rectangular opening 38 in each of the side wall portions 12A of the fitting body 12. As will become clear below, the openings 38 are part of the securing means 27 of the assembly 10 which are provided for securing the end stop grommet 20 to the fitting body 12. Each opening 38 has an edge portion 40 extending therealong and facing in a first direction toward the first opposite end 16 of the fitting body 12.

The end stop grommet 20 of the assembly 10 is preferably fabricated of a plastic material formed by any suitable conventional technique, such as injection molding, into a substantially annular shape longitudinally truncated by a flat side portion 42. The end stop grommet 20 has a general configuration which is substantially similar to that of the fitting body 12 in transverse cross-section but with the first end portion 24 of the grommet body 21 having a diameter size slightly less than that of the fitting body 12 for allowing the first end portion 24 of the grommet body 21 to fit within the interior bore 14 of the fitting body 12. The other part of the securing means 27 is a pair of locking tabs 44 rigidly attached to and disposed on opposite sides of the first end portion 24 of the grommet body 21 and projecting outwardly therefrom. Each locking tab 44 has an edge 46 facing in a second direction toward the second opposite end 18 of the fitting body 12 opposite from the first direction faced by the edge portion 40 of one of the openings 38 in the fitting body 12. The locking tabs 44 are brought into locking engagement with the edge portions 40 of openings 38 in the fitting body 12 upon insertion of the first end portion 24 of the grommet body 21 into the interior bore 14 of the fitting body 12 from the second opposite end 18 thereof to the predetermined position within the interior bore 14, as seen in FIGS. 2 and 3. The engagement of the grommet body locking tab edges 46 with the fitting body opening edge portions 40 enables the fitting body 12 and the end stop grommet to be interfitted to one another in a snap-fit relationship. Also, the flat side portion 42 of the end stop grommet 20 has a substantially rectangular longitudinal relief portion 42A which is disposed in the same plane as the flat side 32 of the fitting body 12 upon insertion of the end stop grommet 20 into the interior bore 14 of the fitting body 12.

The second end portion 26 of the grommet body 21 of the end stop grommet 20 has outer means defining a first stop element for preventing the grommet body 21 from inserting into the interior bore 14 of the fitting body 12 beyond the predetermined position therein. Preferably, the outer means defining the first stop element takes the form of an outer flange 50 at the second end portion 26 of the grommet body 21 which extends radially outwardly beyond the grommet body 21 and makes flush contact with the fitting body 12 at the second opposite end 18 thereof which is fitted over the grommet body 21. Thus, it can be appreciated, that the outer flange 50 prevents the grommet body 21 from being inserted too far into the interior bore 14 of the fitting body 12, whereas, the flat side portion 42 of the end stop grommet 20 in conjunction with the locking tabs 44 of the grommet body 21 that lock into the openings 38 of the fitting body 12 prevent the end stop grommet 20 from twisting within and withdrawing from the interior bore 14 of the fitting body 14.

Further, the second end portion 26 of the grommet body 21 of the end stop grommet 20 also has inner means 52 defining a second stop element for blocking the end portion of the conduit C from extending or projecting through the second end portion 26 of the grommet body 21. Preferably, the inner means 52 defining the second stop element takes the form of an end wall 54 disposed inwardly from the outer flange 50 at the second end portion 26 of the grommet body 21 for retaining the end portion of the conduit C within the interior cavity 22 and thereby preventing the end portion of the conduit C from extending further into the electrical junction box B. The end wall 54 of the grommet body 21 also defines an aperture 56 through the second end portion 26 of the grommet body 21 in the form of a round passage therethrough for permitting the electrical wiring W emanating from the end portion P of the conduit C to pass into the electrical junction box B. The first end portion 24 of the grommet body 21 defining the interior cavity 22 has a first diameter size adapted to receive the end portion of the conduit C, whereas, the aperture or round passage 56 has a second diameter size, less than the first diameter size and less than the diameter size of the interior cavity 22 of the grommet body 21, for allowing the passing of the electrical wiring W through the second end portion 26 of the grommet body 21. Furthermore, the round passage 56 is both off-centered (relative to the end wall 54 and also to the knockout opening K of box B) and smooth for permitting the electrical wiring W from the conduit C to align with and pass through without snagging or hanging up on the electrical junction box B.

Referring now to FIGS. 1 to 7, the gripping means 28 of the assembly 10 includes a spring clip 58. The spring clip 58 is per se substantially the same as that used in the prior art Hubbell conduit connector device except for the feature of the present invention incorporated therein. The spring clip 58 is preferably made from a suitable flat sheet of metal material, such as steel, and manufactured, using a suitable conventional forming technique, so as to include a generally flat resiliently flexible main body 60 having a first generally J-shaped curved portion 62 terminating in a gripping end portion 64 which is curved away from the flat main body 60, and a second end 66 having a pair of opposite corner ears 68 formed to extend outwardly at acute angles to the main flat body 60 in an opposite direction therefrom compared to the direction in which the first curved end 62 extends therefrom. The spring clip 58 also includes a pair of middle side fins 70 attached along opposite sides of the flat main body 60 intermediately between the opposite ends 62, 66 and extending outwardly toward the gripping end portion 64 of the first curved end 62. The spring clip 58 is attachable to the fitting body 12 along the flat side portion 32 thereof by being inserted from the first opposite end 16 over the flat side portion 32 of the fitting body 12. The spring clip 58 also has a hole 72 formed through its flat main body 60 at a location between the middle side fins 70 and the second end 66 thereof.

In order to provide for installment and securement of the spring clip 58 to the fitting body 12, the fitting body 12 has a pair of opposite recesses 74 on opposite sides of the longitudinal slit 34 along the flat side portion 32 thereof. The recesses 74 and slit 34 together have a width extending transversely across the flat side portion 32 of the fitting body 12 which is greater than a width across the flat main body 60 of the spring clip 58 so that the recesses 74 can receive therethrough the middle side fins 70 on the spring clip 58 upon the insertion of the flat side portion 32 at the first end 16 of the fitting body 12 between the middle side fins 70 and the gripping end portion 64 of the first curved end 62 of the body 60 of the spring clip 58. This means of securement of the spring clip 58 to the fitting body 12 permits the spring clip 58 to pivot at the first curved end 62 thereof toward and away from the flat side portion 32 of the fitting body 12.

The gripping means 28 of the assembly 10 also includes a grip tab 76 disposed on the fitting body 12 opposite from the flat side portion 32 thereof and projecting inwardly into the interior bore 14 of the fitting body 12. The gripping end portion 64 of the body 60 of the spring clip 58 and the grip tab 76 of the fitting body 12 extend into recesses or inner convolutions X defined between opposite sides of outer convolutions V formed at the external of the conduit C and thereby cooperate together to grip and secure the conduit C within the interior bore 14 of the fitting body 12. In most instances, the convolutions X, V extend at a predetermined slight, or small acute, pitch angle J, such as between five and fifteen degrees, and usually about ten degrees, relative to a reference plane R disposed perpendicular to a longitudinal axis A of the conduit C.

The connecting means 30 of the assembly 10 for connecting the fitting body 12 to the electrical junction box B includes the pair of securing tabs 36 of the fitting body 12 making contact with an exterior side E of a wall L of the electrical junction box B adjacent to the knockout opening K thereof where the fitting body 12 is received therethrough, a connecting tab 78 attached to and disposed on the fitting body 12 opposite from the flat side portion 32 thereof and projecting outwardly therefrom and in substantially perpendicular relation to the fitting body 12 adjacent to the second end 18 thereof and making flush contact with an interior side I of the wall L of the electrical junction box B adjacent to the knockout opening K thereof, and the pair of corner ears 68 at the second end 66 of the spring clip 58 making contact with the interior side I of the wall L of the electrical junction box B adjacent to the knockout opening K thereof. The connecting tab 78 of the fitting body 12, the corner ears 68 of the spring clip 58, and the pair of securing tabs 36 of the fitting body 12 cooperate together to releasably connect the assembly 10 to the electrical junction box B upon insertion of the second opposite end 18 of the fitting body 12 through the knockout opening K and into the electrical junction box B.

Referring now to FIGS. 6 to 9, in accordance with the feature of the present invention the gripping end portion 64 of the body 60 of the spring clip 58 defines a grip end 64A for gripping the conduit C and having a substantially scalloped configuration for gripping and fitting on and partially about the conduit C to center the grip end 64A on the conduit C. The grip end 64A having the scalloped configuration is preferably in the form of an arcuate concave-shaped edge surface on the gripping end portion 64 of the body 60. The grip end 64A as illustrated in FIG. 8 is disposed substantially transverse to a longitudinal axis 80 of the fitting body 12 and makes line contact with the inner convolution X on the exterior of the conduit C and makes at least a single point contact with the outer convolution V on the exterior of the conduit C because the convolutions X, V of the conduit C usually extend at the predetermined slight pitch angle J, such as between five and fifteen degrees, relative to a reference plane R disposed perpendicular to a longitudinal axis A of the conduit C.

Referring now to FIGS. 10 and 11 the grip end 64A on the gripping end portion 64 of the body 60 of the spring clip 58 may be disposed at a predetermined angle for matching the predetermined pitch angle J of convolutions X, V on the exterior of the conduit C and thereby making substantially line contact with an inner convolution X of the conduit C and making a pair of point contacts with an outer convolution V of the conduit C. This embodiment of the grip end 64A provides a greater and more uniformly applied gripping force that will substantially prevent the conduit C from being pulled out from the connector assembly 10. The grip end 64A may be angled such as by being cutoff at a small acute predetermined angle T, such as between about five to fifteen degrees and preferably about ten degrees, relative to the reference plane R in order to provide the line contact and pair of point contacts with the contacted portions of the conduit convolutions V. The predetermined angle T of the grip end 64A is substantially equal to the predetermined pitch angle J of the conduit convolutions X, V.

As seen in FIGS. 9 and 11, the gripping end portion 64 of the body 60 of the spring clip 58 has a pair of opposite sides 64B which may be fabricated to be disposed at the predetermined angle T, such as between five and fifteen degrees, and preferably ten degrees, relative to the longitudinal axis 80 of the fitting body 12. The grip end 64A is provided substantially transverse to the opposite sides 64B so as to thereby extend at the predetermined angle T, such as between five and fifteen degrees, and preferably at ten degrees, relative to the reference plane R which thereby provides the grip end 64A making the line contact on an inner convolution X and making the pair of point contacts on an outer convolution V on the exterior of the conduit C.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A spring clip for a conduit connector assembly used to attach a conduit carrying electrical wires to an electrical junction box, said spring clip comprising:
   (a) a resiliently flexible body; and
   (b) a gripping end portion on said body defining a grip end having a substantially scalloped configuration for gripping and fitting partially about the conduit so as to center said grip end of said body on the conduit, said grip end of said gripping end portion of said body makes line contact with an inner convolution on an exterior of the conduit and makes at least a single point contact with an outer convolution on the exterior of the conduit.

2. The spring clip as recited in claim 1, wherein said grip end having the scalloped configuration is in the form of an arcuate concave-shaped edge surface on said gripping end portion of said body.

3. A spring clip for a conduit connector assembly used to attach a conduit carrying electrical wires to an electrical junction box, said spring clip comprising:
   (a) a resiliently flexible body: and
   (b) a gripping end portion on said body defining a grip end having a substantially scalloped configuration for gripping and fitting partially about the conduit so as to center said grip end of said body on the conduit, said grip end of said gripping end portion of said body being disposed at a predetermined angle for matching a predetermined pitch angle of convolutions on an exterior of the conduit and thereby makes line contact with an inner convolution on the exterior of the conduit and makes a pair of point contacts with an outer convolution on the exterior of the conduit.

4. A spring clip for a conduit connector assembly used to attach a conduit carrying electrical wires to an electrical junction box, said spring clip comprising:
   (a) a resiliently flexible body; and
   (b) a gripping end portion on said body defining a grip end having a substantially scalloped configuration for gripping and fitting partially about the conduit so as to center said grip end of said body on the conduit, said grip end of said gripping end portion of said body being disposed at a predetermined angle between five and fifteen degrees for matching a predetermined pitch angle of convolutions on an exterior of the conduit and thereby makes line contact with an inner convolution on the exterior of the conduit and makes a pair of point contacts with an outer convolution on the exterior of the conduit.

5. A spring clip for a conduit connector assembly used to attach a conduit carrying electrical wires to an electrical junction box, said spring clip comprising:
   (a) a resiliently flexible body; and
   (b) a gripping end portion on said body defining a grip end having a substantially scalloped configuration for gripping and fitting partially about the conduit so as to center said grip end of said body on the conduit, said grip end of said gripping end portion of said body being disposed at a predetermined angle of about ten degrees for matching a predetermined pitch angle of convolutions on an exterior of the conduit and thereby makes line contact with an inner convolution on the exterior of the conduit and makes a pair of point contacts with an outer convolution on the exterior of the conduit.

6. A conduit connector assembly for attachment of a conduit carrying electrical wires to an electrical junction box, said conduit connector assembly comprising:

(a) a fitting body having a pair of open first and second opposite ends and an interior bore extending between said first and second opposite ends for receiving therein from said first opposite end an end portion of the conduit carrying electrical wiring which emanates from the end portion of the conduit, said fitting body at said second opposite end being insertable through an opening in an electrical junction box;

(b) end stop means on said fitting body for allowing passage of the electrical wiring into the electrical junction box and preventing passage of the end portion of the conduit into the electrical junction box;

(c) a spring clip mounted to said fitting body and having a resiliently flexible body and a gripping end portion on the body defining a grip end disposed within said interior bore of said fitting body, said grip end having a substantially scalloped configuration for gripping and fitting partially about the conduit so as to center the grip end of the body on the conduit, said grip end of said gripping end portion of said body of said spring clip makes line contact with an inner convolution on an exterior of the conduit and makes at least a single point contact with an outer convolution on the exterior of the conduit; and (d) means on said fitting body for connecting said fitting body to the electrical junction box.

7. The assembly as recited in claim 6, wherein:
said fitting body further has a longitudinal axis; and
said gripping end portion of said body of said spring clip has a pair of opposite sides disposed at a predetermined angle in relation to said longitudinal axis of said fitting body.

8. The assembly as recited in claim 6, wherein:
said fitting body further has a longitudinal axis; and
said gripping end portion of said body of said spring clip has a pair of opposite sides disposed at a predetermined angle between five and fifteen degrees in relation to said longitudinal axis of said fitting body.

9. The assembly as recited in claim 6, wherein:
said fitting body further has a longitudinal axis; and
said gripping end portion of said body of said spring clip has a pair of opposite sides disposed at a predetermined angle of about ten degrees in relation to said longitudinal axis of said fitting body.

10. The assembly as recited in claim 6, wherein said grip end having said scalloped configuration is in the form of an arcuate concave-shaped edge surface on said gripping end portion of said body.

11. A conduit connector assembly for attachment of a conduit carrying electrical wires to an electrical junction box, said conduit connector assembly comprising:

(a) a fitting body having a pair of open first and second opposite ends and an interior bore extending between said first and second opposite ends for receiving therein from said first opposite end an end portion of the conduit carrying electrical wiring which emanates from the end portion of the conduit, said fitting body at said second opposite end being insertable through an opening in an electrical junction box;

(b) end stop means on said fitting body for allowing passage of the electrical wiring into the electrical junction box and preventing passage of the end portion of the conduit into the electrical junction box;

(c) a spring clip mounted to said fitting body and having a resiliently flexible body and a gripping end portion on the body defining a grip end disposed within said interior bore of said fitting body, said grip end having a substantially scalloped configuration for gripping and fitting partially about the conduit so as to center the grip end of the body on the conduit, said grip end of said gripping end portion of said body of said spring clip being disposed at a predetermined angle of about ten degrees for matching a predetermined pitch angle of convolutions on an exterior of the conduit and thereby makes line contact with an inner convolution on the exterior of the conduit and makes a pair of point contacts with an outer convolution on the exterior of the conduit; and (d) means on said fitting body for connecting said fitting body to the electrical junction box.

12. A conduit connector assembly for attachment of a conduit carrying electrical wires to an electrical junction box, said conduit connector assembly comprising:

(a) a fitting body having a pair of open first and second opposite ends and an interior bore extending between said first and second opposite ends for receiving therein from said first opposite end an end portion of the conduit carrying electrical wiring which emanates from the end portion of the conduit, said fitting body at said second opposite end being insertable through an opening in an electrical junction box;

(b) end stop means on said fitting body for allowing passage of the electrical wiring into the electrical junction box and preventing passage of the end portion of the conduit into the electrical junction box;

(c) a spring clip mounted to said fitting body and having a resiliently flexible body and a gripping end portion on the body defining a grip end disposed within said interior bore of said fitting body, said grip end having a substantially scalloped configuration for gripping and fitting partially about the conduit so as to center the grip end of the body on the conduit, said grip end of said gripping end portion of said body of said spring clip being disposed at a predetermined angle for matching a predetermined pitch angle of convolutions on an exterior of the conduit and thereby makes line contact with an inner convolution on the exterior of the conduit and makes a pair of point contacts with an outer convolution on the exterior of the conduit; and (d) means on said fitting body for connecting said fitting body to the electrical junction box.

13. A conduit connector assembly for attachment of a conduit carrying electrical wires to an electrical junction box, said conduit connector assembly comprising:

(a) a fitting body having a pair of open first and second opposite ends and an interior bore extending between said first and second opposite ends for receiving therein from said first opposite end an end portion of the conduit carrying electrical wiring which emanates from the end portion of the conduit, said fitting body at said second opposite end being insertable through an opening in an electrical junction box;

(b) end stop means on said fitting body for allowing passage of the electrical wiring into the electrical junction box and preventing passage of the end portion of the conduit into the electrical junction box;

(c) a spring clip mounted to said fitting body and having a resiliently flexible body and a gripping end portion on the body defining a grip end disposed within said interior bore of said fitting body, said grip end having a substantially scalloped configuration for gripping and fitting partially about the conduit so as to center the grip end of the body on the conduit, said grip end of said gripping end portion of said body of said spring clip being disposed at a predetermined angle between five and fifteen degrees for matching a predetermined pitch angle of convolutions on an exterior of the conduit and thereby makes line contact with an inner convolution on the exterior of the conduit and makes a pair of point contacts with an outer convolution on the exterior of the conduit; and (d) means on said fitting body for connecting said fitting body to the electrical junction box.

* * * * *